(12) United States Patent
Suzuki et al.

(10) Patent No.: US 6,811,111 B2
(45) Date of Patent: Nov. 2, 2004

(54) METHOD OF AND APPARATUS FOR PRODUCING FILM SCROLL

(75) Inventors: Chiaki Suzuki, Minamiashigara (JP); Akihiko Hase, Minamiashigara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/320,621

(22) Filed: Dec. 17, 2002

(65) Prior Publication Data
US 2003/0122025 A1 Jul. 3, 2003

(30) Foreign Application Priority Data
Dec. 28, 2001 (JP) .................................. 2001-399826

(51) Int. Cl.⁷ ........................... B65H 19/28; B65H 19/30
(52) U.S. Cl. ............................ 242/532.6; 242/532.7; 242/533.4
(58) Field of Search .................. 242/523.1, 532.6, 242/532.7, 533.2, 533.4, 533.5, 533.6

(56) References Cited
U.S. PATENT DOCUMENTS
5,743,482 A  4/1998  Suzuki et al.
6,604,702 B2 *  8/2003  Karaki et al. ............ 242/533.4

FOREIGN PATENT DOCUMENTS

| JP | 60-53868 | 11/1985 |
| JP | 01285937 | 11/1989 |
| JP | 9-68779 | 3/1997 |
| JP | 09297375 | 11/1997 |
| JP | 10020454 | 1/1998 |
| JP | 2777668 | 5/1998 |
| JP | 10186587 | 7/1998 |
| JP | 11212218 | 8/1999 |
| JP | 2000238938 | 9/2000 |

* cited by examiner

Primary Examiner—John M. Jillions
(74) Attorney, Agent, or Firm—Sughrue Mion, PLLC

(57) ABSTRACT

A film scroll producing apparatus has an engaging slot attitude setting station ST2 for setting an engaging slot of the spool to an attitude within a predetermined angular range. The scroll producing apparatus also has a film inserting station ST3 including an engaging slot phasing mechanism for phasing the spool before an elongate film is inserted therein thereby to align the engaging slot with an angular position for film insertion. In the film inserting station ST3, the leading end of the elongate film F is inserted into the engaging slot of the spool.

9 Claims, 16 Drawing Sheets

METHOD OF AND APPARATUS FOR PRODUCING FILM SCROLL

BACKGROUND OF THE INVENTION

1. Field of the Invention

The present invention relates to a method of and an apparatus for automatically producing a film scroll which comprises a film wound around a spool.

2. Description of the Related Art

Photosensitive films are processed and packaged by performing various processes which include cutting off a film of fixed length, winding the film of fixed length around a spool to produce a film scroll, inserting the film scroll into a cartridge, and loading the cartridge housing the film scroll into a case.

Heretofore, there have been proposed methods and apparatus for producing film scrolls by winding films of fixed length around spools on an intermittently rotatable index table which has a plurality of stations thereon for performing respective allotted tasks to process and assemble components into film scrolls. One example of such a method and apparatus for producing a film scroll is disclosed in Japanese Patent Publication No. 2777668.

According to the disclosed method and apparatus, as shown in FIG. 16 of the accompanying drawings, a plurality of, e.g., six, spool chucks 2 are disposed at equal angular intervals on a turntable 1 which is intermittently rotatable in the direction indicated by the arrow. The turntable 1 has a first station (I) in which a spool 3 is supplied to one of the spool chucks 2, a second station (II) in which the spool 3 is rotated to allow a pawl 4 into engagement with the spool 3 thereby to orient or phase a slit 5 in the spool 3, a third station (III) in which the leading end of a film F0 is inserted along an insertion guide 6 into the slit 5 in the spool 3, a fourth station (IV) in which the film F0 is wound around the spool 3, producing a film scroll 7, a fifth station (V) in which the film scroll 7 is inspected for its presence or absence, and a sixth station (VI) in which the film scroll 7 is retrieved.

When the turntable 1 is intermittently rotated in the direction indicated by the arrow, the spool chucks 2 are successively moved to the first through sixth stations (I) through (VI) where respective allotted tasks are performed.

On the turntable 1, the slit 5 in the spool 3 is phased in the second station (II) and the slit 5 is not phased, but the leading end of the film F0 is inserted into the slit 5 in the third station (III).

After the slit 5 in the spool 3 is phased in the second station (II), the turntable 1 is turned 60°, for example, in the direction indicated by the arrow, to bring the spool 3 into the third station (III). Since the turntable 1 is abruptly accelerated and decelerated in the second and third stations (II), (III), the spool 3 tends to be positionally shifted under external forces applied thereto, changing its angular position, i.e., shifting the slit 5 out of phase.

Specifically, since the spools 3 are held in the respective spool chucks 2 merely under frictional forces, it is difficult to keep the spools 3 fixed against movement when the turntable 1 is rotated at a high speed. In the third station (III), therefore, the spool 3 is liable to be turned out of phase, and the film F0 cannot stably be inserted into the slit 5. If the slit 5 is shifted out of phase by ±1° or more, for example, then the film F0 cannot be inserted into the slit 5 in the third station (III). The conventional arrangement shown in FIG. 16 is thus disadvantageous in that films F0 may not successively be wound around respective spools 3, and hence the overall process of producing film scrolls 7 may not be carried out efficiently.

SUMMARY OF THE INVENTION

It is therefore a main object of the present invention to provide a method of and an apparatus for producing a film scroll highly efficiently by aligning a spool accurately with an angular position for film insertion.

The present invention has a plurality of intermittently movable spool chucks and moves each of the spool chucks successively through a spool installing station for installing a spool on the spool chuck, a film inserting station for inserting and engaging the leading end of a film in the spool, a film winding station for winding the film around the spool, and a film scroll removing station for removing a film scroll, which comprises the film wound around the spool, from the spool chuck.

Prior to the film inserting station, the spool is set to an attitude in a predetermined angular range such that an engaging slot of the spool corresponds to an attitude thereof in the film inserting station, and a spool phasing means for phasing the spool reliably performs its action, i.e., the spool is angularly moved into a final position in the film inserting station. When the spool is moved to the film inserting station, the engaging slot thereof is angularly spaced by a predetermined angle for preventing film insertion in one direction from an angular position for film insertion. For example, the film insertion end of the engaging slot is angularly spaced downwardly by 3° to 45°, more preferably 5° to 30° from the angular position for film insertion.

In the film inserting station, before the leading end of the film is inserted into the engaging slot, the spool is phased to align the engaging slot with the angular position for film insertion.

Since the engaging slot of the spool is phased in the film inserting station, the spool is free from phase misalignments which would otherwise occur if the spool were phased in a previous step and then moved to the film inserting station for insertion of the film. In the film inserting station, therefore, the spool is accurately aligned with the angular position for film insertion for reliable insertion of the film into the engaging slot, so that film scrolls can be produced efficiently and successively.

After the engaging slot of the spool is set to the attitude in the predetermined angular range prior to the film inserting station, the engaging slot is phased in the film inserting station. Therefore, the spool can be phased efficiently and reliably, and the cycle time of operation of the apparatus is effectively prevented from being increased.

In the film inserting station, first and second guides grip the spool to align the engaging slot with the angular position for film insertion, and a film guide passage is defined which extends continuously from the first and second guides to the engaging slot. There is no undue gap created between the first and second guides, and it is possible to insert the leading end of the film which may be largely curled reliably into the engaging slot. The stability with which to insert the leading end of the film into the engaging slot is effectively increased.

After the first guide is moved to the spool, the second guide is angularly moved from a vertical attitude to a horizontal attitude. The first and second guides which are combined with each other turn the spool to align the engaging slot with the angular position for film insertion, and provide the film guide passage. Therefore, the spool can be phased and the film guide passage can be formed efficiently with a simple process and arrangement.

An engaging slot phasing mechanism comprises a first drive mechanism for moving the first guide horizontally to the spool to move a tip end of the first guide closely to the spool, and a second drive mechanism for angularly moving the second guide from a vertical attitude to a horizontal attitude until a tip end of the second guide abuts on the spool, thereby to cause the first and second guides to align the engaging slot with the angular position for film insertion. Consequently, the engaging slot can easily and reliably be aligned with the angular position for film insertion by the first and second guides.

The first and second guides have on their tip ends respective first and second steps facing each other. The first and second steps grip the spool therebetween. Thus, it is possible to form reliably the film guide passage which extends continuously from the first and second guides to the engaging slot.

The first and second steps have their respective depths which are equal to or greater than the thicknesses of walls of the spool which define the engaging slot therebetween. The width of the gap defined between the first and second guides is smaller than the width of the engaging slot. When the leading end of the film is transferred from the first and second guides to the engaging slot, the leading end is not caught by the walls of the spool, but can smoothly and reliably be inserted into the engaging slot.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
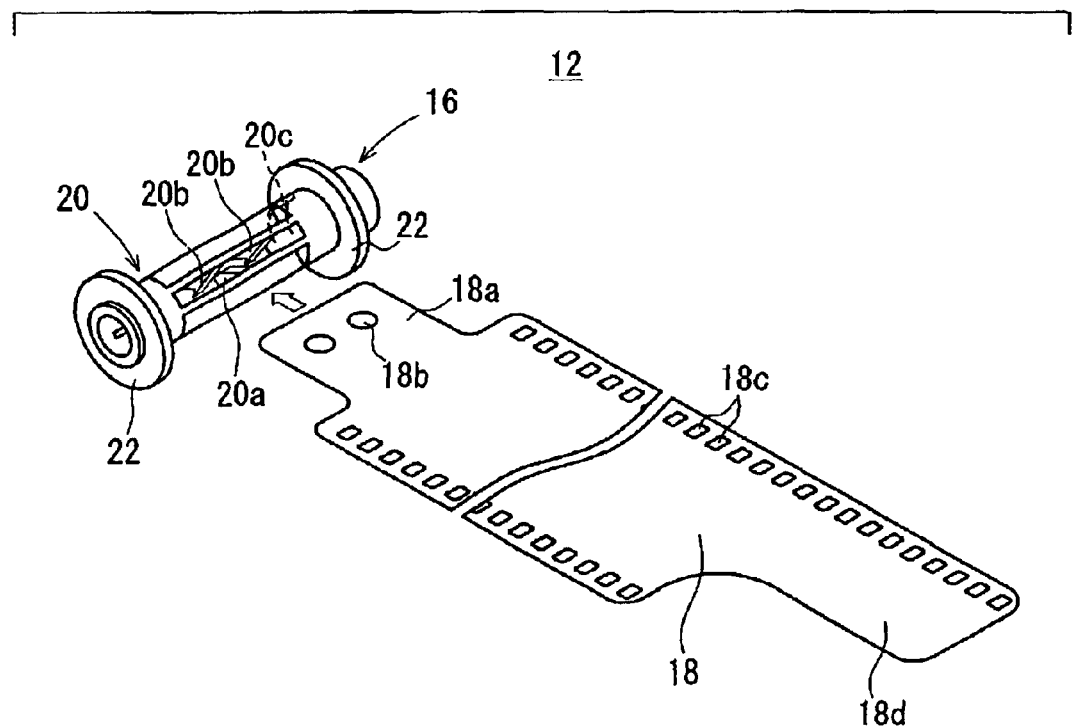
FIG. 1 is an exploded perspective view of a film scroll produced by a film scroll producing apparatus according to a first embodiment of the present invention.
Figure 2:
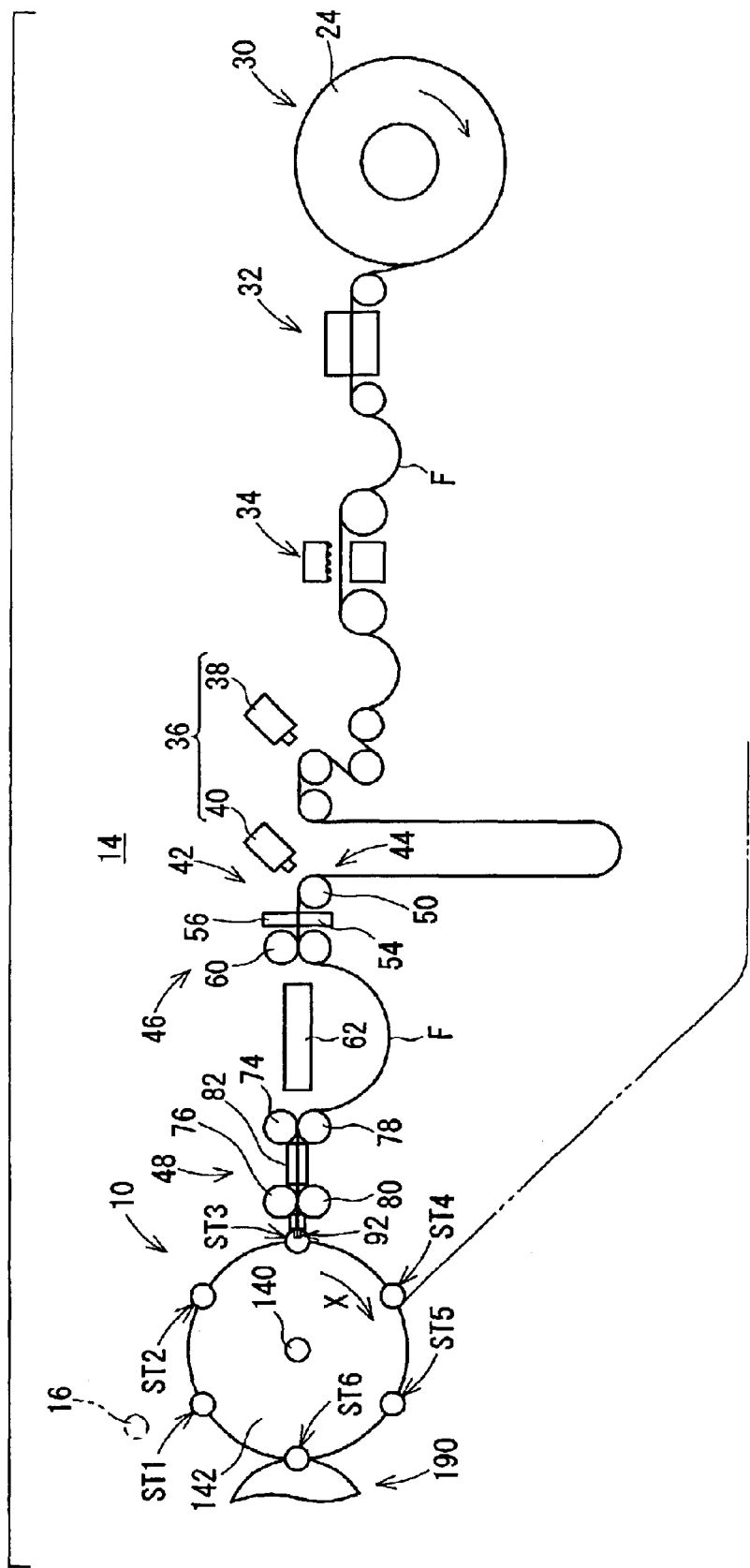
FIG. 2 is a schematic side elevational view of a film processing and packaging system which incorporates the film scroll producing apparatus shown in FIG. 1.
Figure 3:
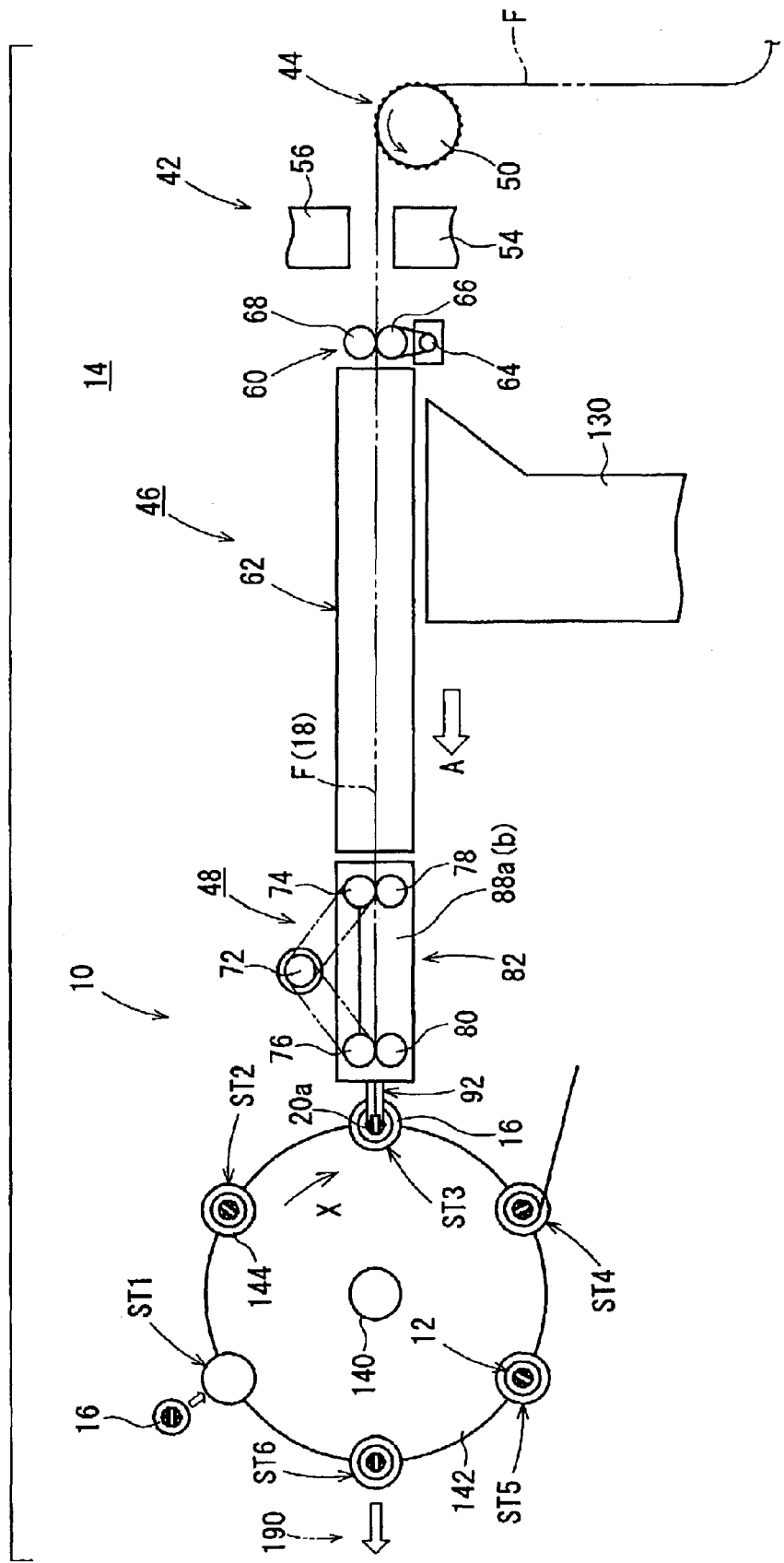
FIG. 3 is a schematic side elevational view of the film processing and packaging system.

FIG. 1 shows in exploded perspective a film scroll 12 produced by a film scroll producing apparatus 10 according to a first embodiment of the present invention. FIG. 2 shows in schematic side elevation a film processing and packaging system 14 which incorporates the film scroll producing apparatus 10. FIG. 3 shows in schematic side elevation the film processing and packaging system 14.

As shown in FIG. 1, the film scroll 12 comprises a spool 16 and a fixed-length film 18 wound around the spool 16. The spool 16 comprises a shank 20 and a pair of flanges 22 integrally joined to the respective opposite ends of the shank 20. The shank 20 has an engaging slot 20a defined therein for insertion therein of a leading end 18a of the fixed-length film 18, with two teeth 20b disposed in the engaging slot 20a. The teeth 20b engage in respective holes 18b defined in the leading end 18a of the fixed-length film 18. The shank 20 has on an end thereof a step 20c for positioning the spool 16.

As shown in FIG. 2, the film processing and packaging system 14 has a unreeling unit 30 for holding and unreeling a film roll 24 of an elongate photosensitive film F (hereinafter referred to as "elongate film F"). The film processing and packaging system 14 also has, downstream of the unreeling unit 30, a splicing unit 32 for splicing the trailing end of a film roll 24 to the leading end of a next film roll 24, a perforating unit 34 for forming perforations 18c (see FIG. 1) in both side edges of the elongate film F unwound from the film roll 24, and a side printing unit 36 for recording a side print as a latent image on one or both side edges of the elongate film F.

The side printing unit 36 has a first printer 38 and a second printer 40. The first printer 38 records a strip-like side print depending on the type of the elongate film F as a latent image on one or both side edges of the elongate film F. The second printer 40 records a DX bar code, frame numbers, frame number bar codes, and a product name depending on the size of the elongate film F as a latent image on the elongate film F.

The film processing and packaging system 14 further includes, downstream of the side printing unit 36, a first feed mechanism 44 for feeding the elongate film F to a cutting mechanism 42 which cuts off the elongate film F into a succession of predetermined lengths, a second feed mechanism 46 disposed downstream of the cutting mechanism 42, for feeding the trailing end 18d of a fixed-length film 18 severed by the cutting mechanism 42 toward a spool 16 disposed in a film inserting station ST3 (described later on), and an inserting mechanism 48 for inserting the leading end 18a of the elongate film F (or the fixed-length film 18) into the spool 16.

As shown in FIG. 3, the first feed mechanism 44 has a sprocket 50 having teeth inserted in perforations 18c defined in the side edges of the elongate film F and rotatable for feeding the elongate film F by a constant length in the direction indicated by the arrow A. The sprocket 50 is rotated in the direction indicated by the arrow by a servomotor, not shown. The cutting mechanism 42 has a fixed blade 54 and a movable blade 56 which are held in vertically confronting relation to each other.

The second feed mechanism 46 comprises a nip roller pair 60 for gripping and feeding the elongate film F or the fixed-length film 18 (hereinafter referred to as "elongate film F"), and an openable and closable film guide 62 disposed between the nip roller pair 60 and the inserting mechanism 48. The nip roller pair 60 comprises a drive roller 66 rotatable by a servomotor 64 and a driven roller 68 held in rolling contact with the drive roller 66 with the elongate film F interposed therebetween.

Figure 4:
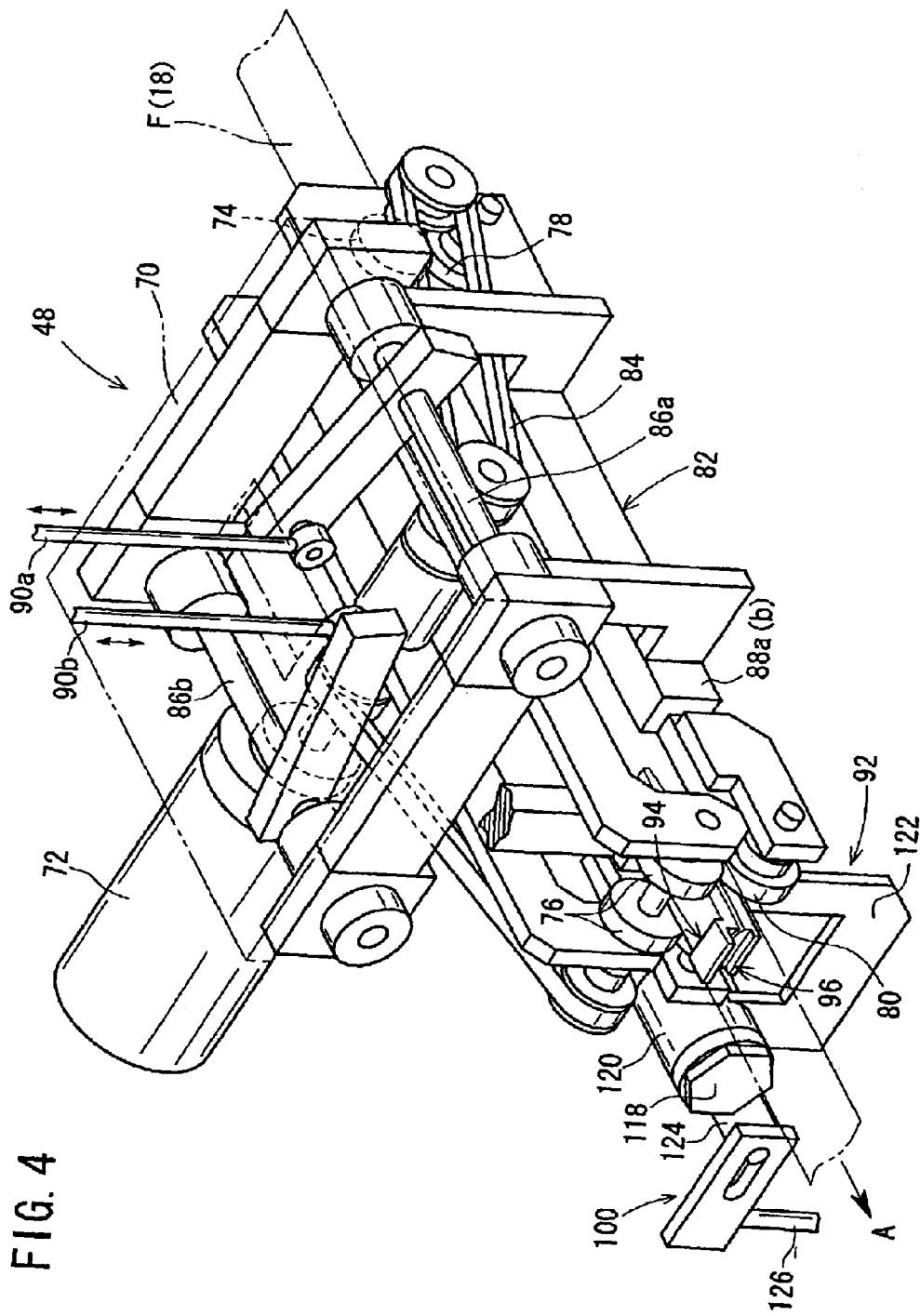
FIG. 4 is an enlarged perspective view of an inserting mechanism of the film processing and packaging system.
Figure 5:
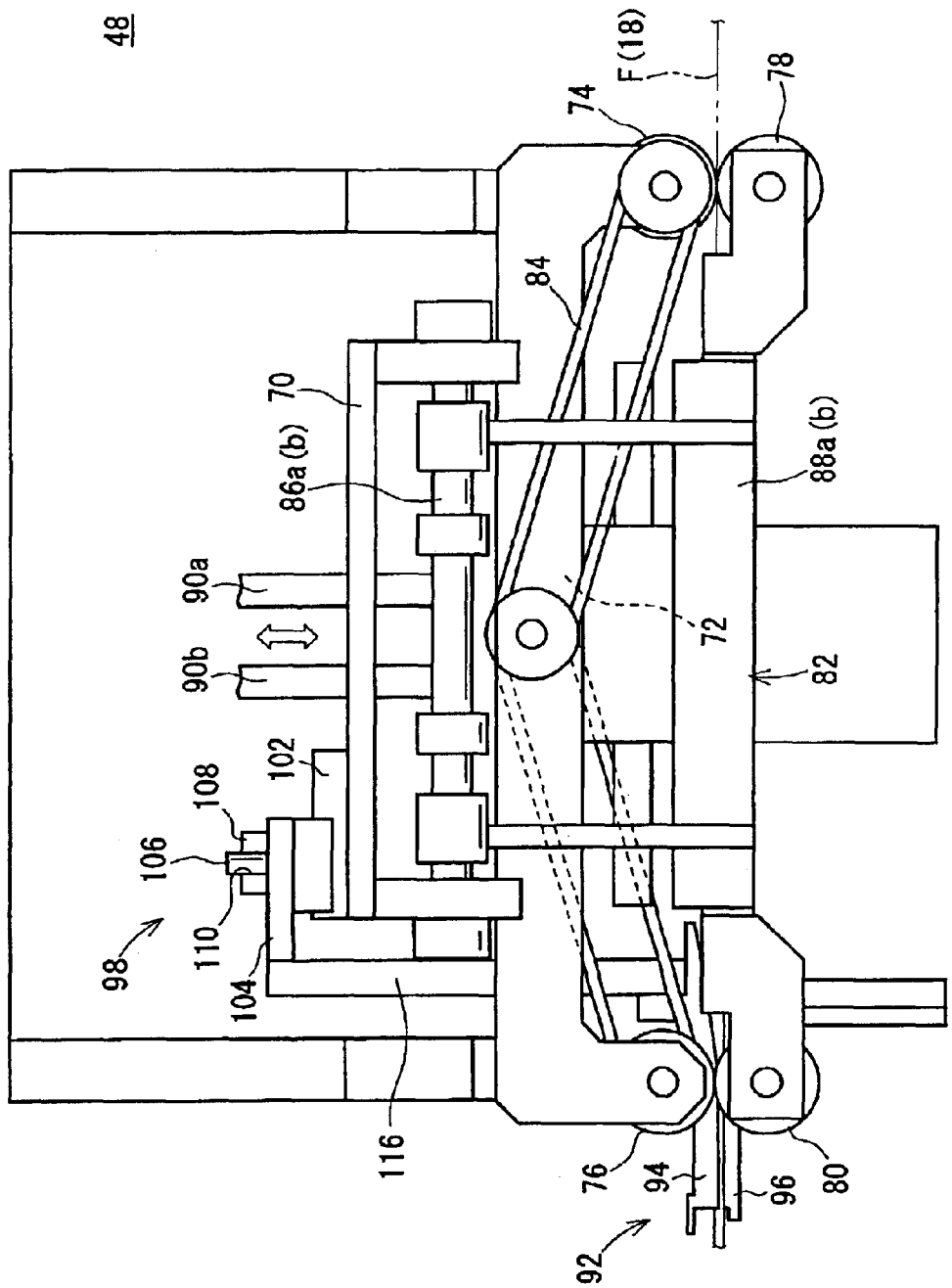
FIG. 5 is a side elevational view of the inserting mechanism.
Figure 6:
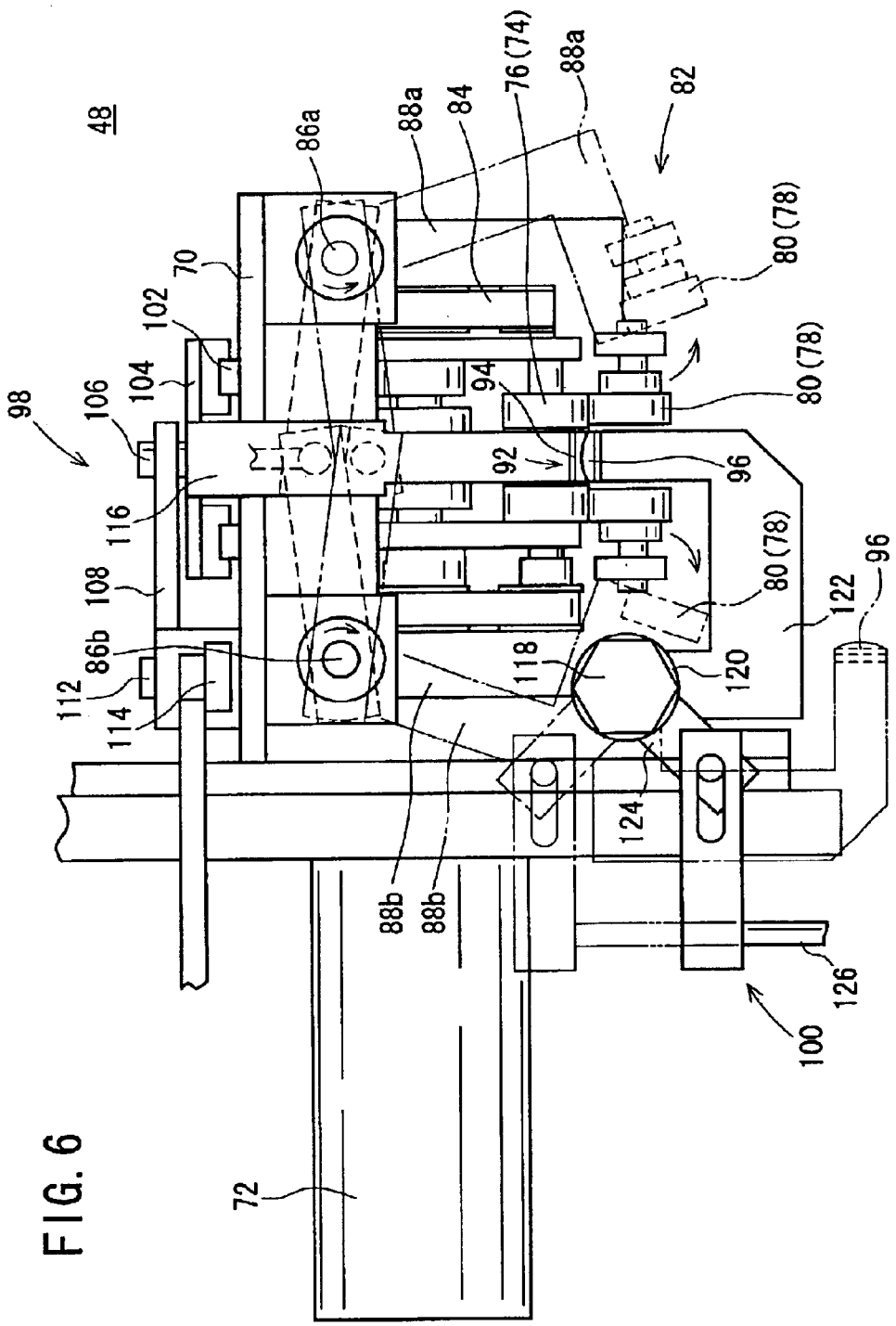
FIG. 6 is a front elevational view of the inserting mechanism.

As shown in FIGS. 4 through 6, the inserting mechanism 48 comprises respective pairs of first and second inserting rollers 74, 76 rotatable in synchronism with each other by an inserting motor 72, such as a servomotor, mounted on a base 70, respective pairs of first and second pinch rollers 78, 80 movable into and out of rolling contact with the first and second inserting rollers 74, 76, and an openable and closable pre-insertion guide 82.

The first and second inserting rollers 74, 76 are rotated by a belt and pulley mechanism 84 operatively coupled to the inserting motor 72. The pre-insertion guide 82 has guide plates 88a, 88b angularly movable about respective pivot shafts 86a, 86b. The first and second pinch rollers 78, 80 are rotatably supported on the guide plates 88a, 88b. The pivot shafts 86a, 86b are angularly movable about their own axes by drive links 90a, 90b operatively connected to the respective pivot shafts 86a, 86b when the drive links 90a, 90b are moved vertically.

Figure 7:
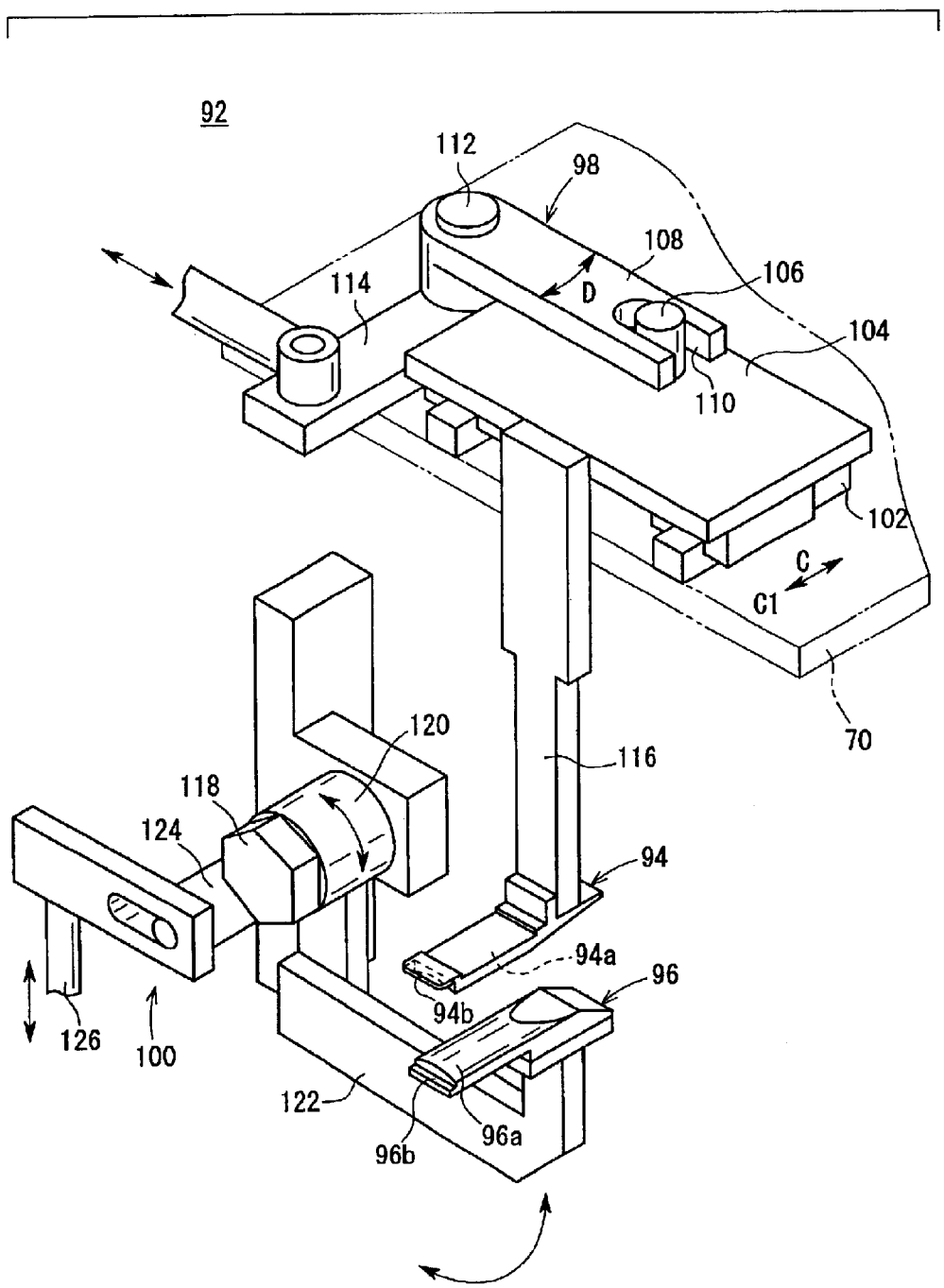
FIG. 7 is a perspective view of an engaging slot phasing mechanism mounted in the inserting mechanism.
Figure 8:
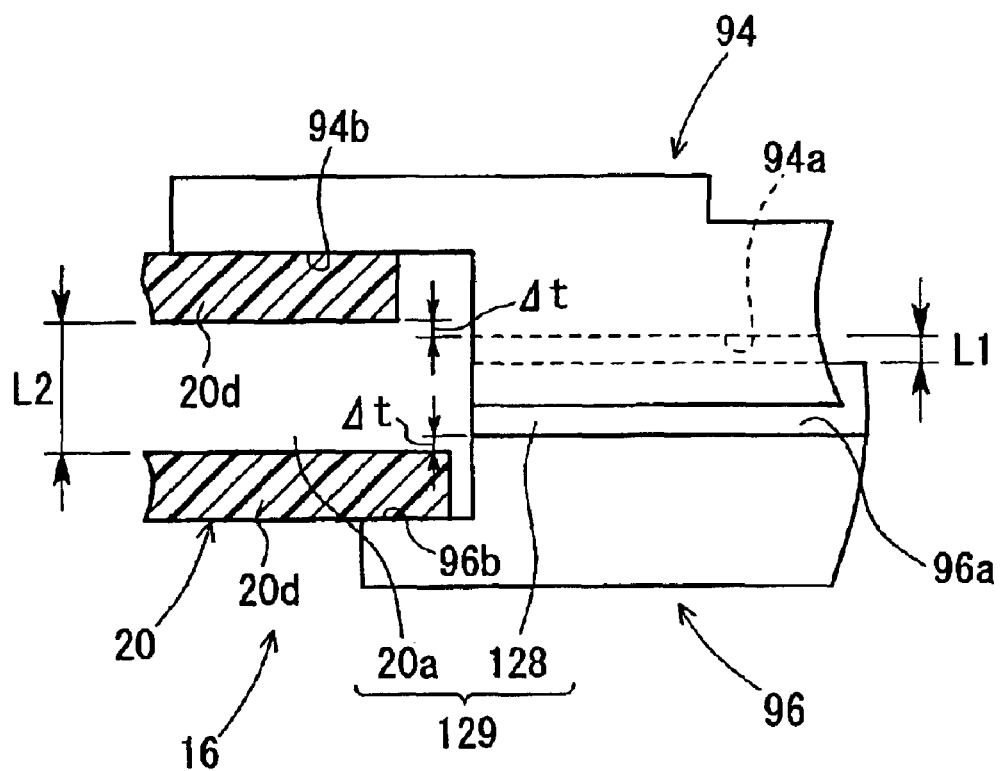
FIG. 8 is an elevational view, partly in cross section, of the engaging slot phasing mechanism.

An engaging slot phasing mechanism 92 is mounted on the base 70 for phasing the spool 16 before the elongate film F is inserted therein, thereby to align the engaging slot 20a of the spool 16 with an angular position B (see FIG. 10) for film insertion. As shown in FIGS. 7 and 8, the engaging slot phasing mechanism 92 has an upper insertion guide (first guide) 94 and a lower insertion guide (second guide) 96 for gripping the spool 16 and aligning the engaging slot 20a with the angular position B for film insertion. The upper insertion guide 94 is horizontally movable by a first drive mechanism 98, and the lower insertion guide 96 is angularly movable from a vertical attitude into a horizontal attitude by a second drive mechanism 100.

The first drive mechanism 98 has a pair of linear guides 102 fixed to the base 70 and extending parallel to each other in the direction indicated by the arrow C, and a slide base 104 movably mounted on the linear guides 102. A post 106 fixedly mounted on the slide base 104 is inserted in an opening 110 defined in the distal end of a swing cam 108. The swing cam 108 is mounted on a shaft 112 connected to a drive link 114. A mount base 116 is fixed to and extends downwardly from a leading end of the slide base 104 in the forward direction thereof which is indicated by the arrow C1. The upper insertion guide 94 is fixed to the lower end of the mount base 116.

The second drive mechanism 100 has a fixed shaft 118 extending horizontally and a movable sleeve 120 angularly movably mounted on and extending around the fixed shaft 118. The lower insertion guide 96 is fixed by an arm 122 to an outer circumferential surface of the movable sleeve 120. A drive link 126 is connected to a link 124 projecting from the outer circumferential surface of the movable sleeve 120. The upper insertion guide 94 and the lower insertion guide 96 have respective curved guide surfaces 94a, 96a facing each other. The curved guide surface 94a comprises a concave surface, and the curved guide surface 96a comprises a convex surface. The curved guide surfaces 94a, 96a grip and support the elongate film F forcibly in a curved shape to prevent the elongate film F from being unduly deformed.

The upper insertion guide 94 and the lower insertion guide 96 have on their tip ends respective first and second steps 94b, 96b which confront each other. The first and second steps 94b, 96b grip the shank 20 of the spool 16 for thereby phasing the spool 16.

As shown in FIG. 8, the first and second steps 94b, 96b have respective depths which are equal to or greater than the thicknesses of a pair of walls 20d of the spool 16 which define the engaging slot 20a therebetween. The upper insertion guide 94 and the lower insertion guide 96 define therebetween a gap 128 whose width L1 is smaller than the width L2 of the engaging slot 20a. Specifically, The curved guide surfaces 94a, 96a of the upper insertion guide 94 and the lower insertion guide 96 are spaced from end faces of the walls 20d by respective distances Δt each in the range from 0 to 1.0 mm, for example. With the spool 16 gripped by the upper insertion guide 94 and the lower insertion guide 96, a film guide passage 129 is defined which extends continuously from the upper insertion guide 94 and the lower insertion guide 96 to the engaging slot 20a.

As shown in FIG. 3, a discharge slot member 130 for automatically discharging defective films is disposed below the film guide 62, the discharge slot member 130 being movable in directions normal to the sheet of FIG. 3.

The film scroll producing apparatus 10 has a turntable (conveyance mechanism) 142 fixedly mounted on a main shaft 140 which is intermittently rotatable in the direction indicated by the arrow X. The turntable 142 has a plurality of, e.g., six, spool chucks 144 are disposed at equal angular intervals thereon. The turntable 142 has a spool installing station ST1, an engaging slot attitude setting station ST2, a film inserting station ST3, a prewinding station ST4, a winding station ST5, and a film scroll removing station ST6 which are successively arranged clockwise in the direction indicated by the arrow X.

Figure 9:
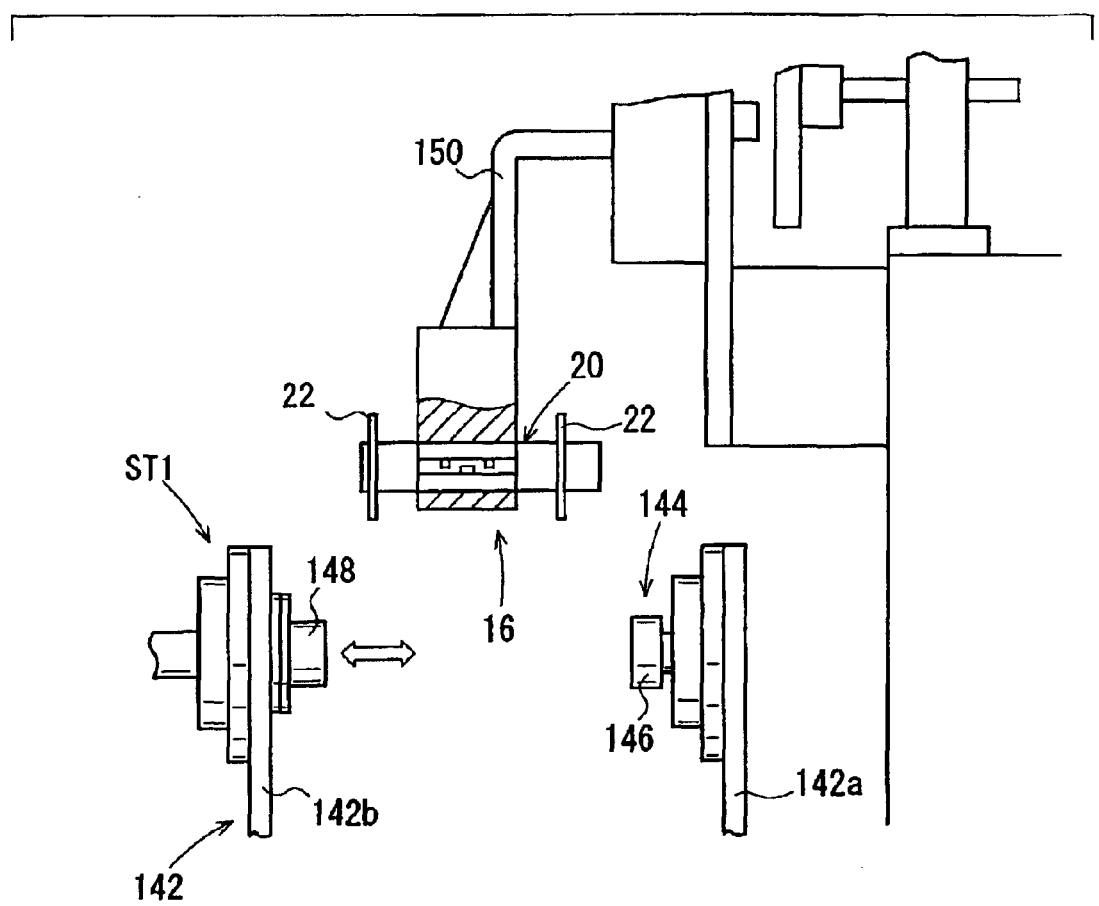
FIG. 9 is an elevational view, partly in cross section, of a spool installing station.

As shown in FIG. 9, the turntable 142 has a pair of rotary plates 142a, 142b. The spool chucks 144 comprise respective fixed chucks 146 fixedly mounted on the rotary plate 142a and respective movable chucks 148 movably mounted on the rotary plate 142b and spring-loaded for back-and-forth movement in the directions indicated by the arrows. In a spool transfer position in the spool installing station ST1, a spool 16 is delivered by a vertically movable support arm 150 into a position between the fixed chuck 146 and the movable chuck 148 of one spool chuck 144.

Figure 10:
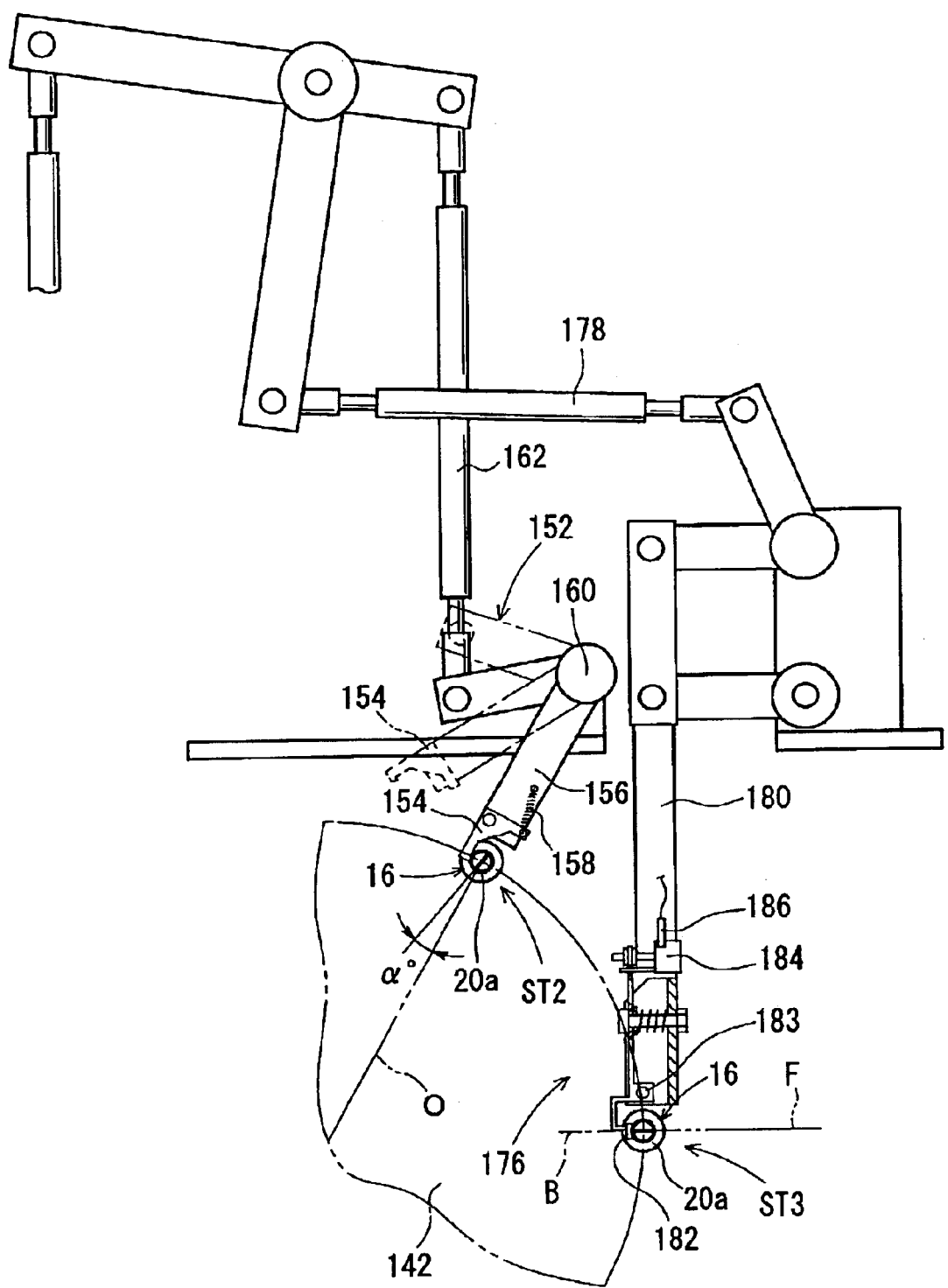
FIG. 10 is an elevational view of an engaging slot attitude setting mechanism and an insertion detecting mechanism.

As shown in FIG. 10, the engaging slot attitude setting station ST2 has an engaging slot attitude setting mechanism 152 for setting the engaging slot 20a to an attitude in a predetermined angular range such that when a spool 16 is placed in the film inserting station ST3, the engaging slot 20a of the spool 16 is angularly spaced a predetermined angle for preventing film insertion in one direction from the angular position B for film insertion.

The engaging slot attitude setting mechanism 152 has a pawl 154 mounted on the distal end of a swing arm 156 and tiltably connected thereto by a spring 158. The swing arm 156 is angularly movable about a swing shaft 160 and connected to a drive link 162. When the pawl 154 engages the spool 16 to set its attitude in the engaging slot attitude setting station ST2, the film insertion end of the engaging slot 20a of the spool 16 is angularly spaced downwardly by $\alpha°$ (3° to 45°, more preferably 5° to 30°) from a central line O passing through the center of the turntable 142.

The pawl 154 is movable by the swing arm 156 between a position (indicated by the two-dot-and-dash lines in FIG. 10) in which it is held out of interference with the feeding of the spool 16 and a position (indicated by the solid lines in FIG. 10) in which it engages the step 20c of the spool 16 placed in the engaging slot attitude setting station ST2 to set the attitude of the spool 16. The engaging slot attitude setting station ST2 also has a rotary actuator (not shown) for rotating the spool 16 held by the spool chuck 144 under a predetermined torque.

Figure 11:
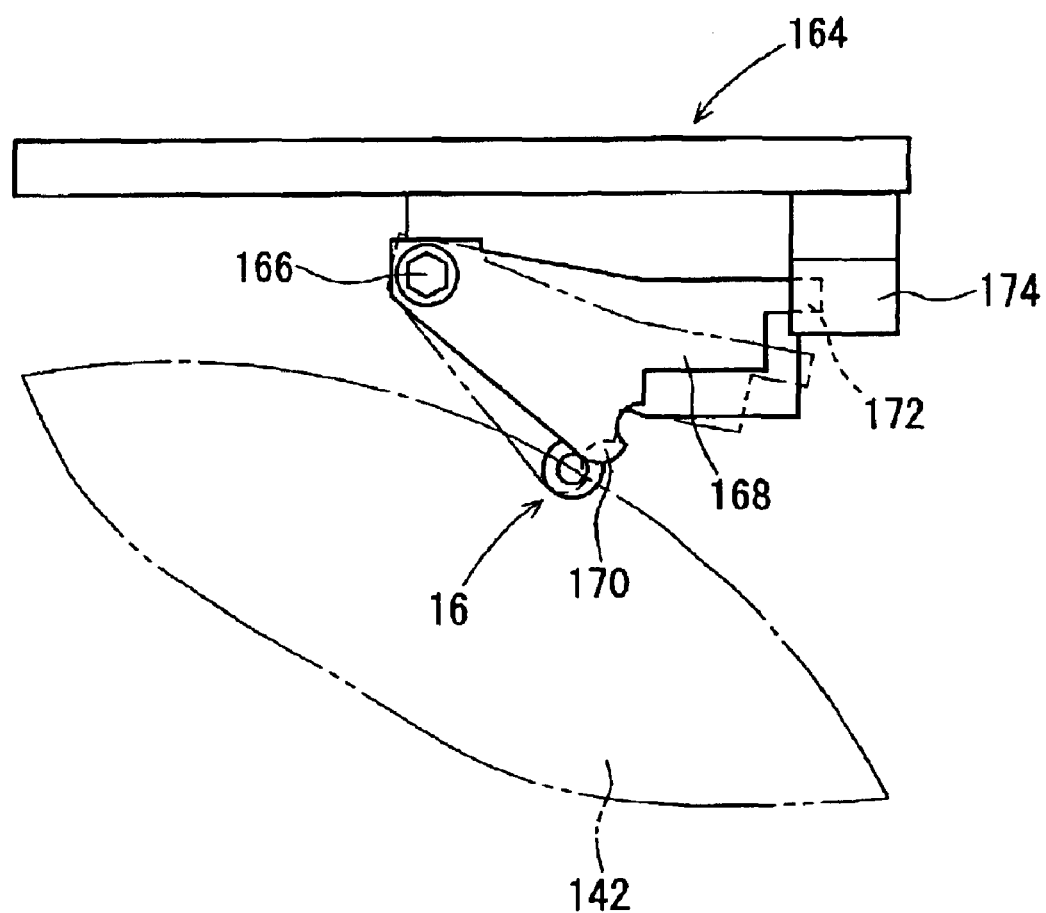
FIG. 11 is an elevational view of a spool detecting mechanism.

As shown in FIG. 11, a spool detecting mechanism 164 for detecting when a spool 16 is introduced into the engaging slot attitude setting station ST2 is disposed near the engaging slot attitude setting station ST2 upstream thereof. The spool detecting mechanism 164 has a detecting member 168 angularly movable about a fixed shaft 166 and having a curved detecting surface 170 on a lower end thereof. The detecting member 168 has a detecting probe 172 on its distal end remote from the fixed shaft 166. When a spool 16 contacts the detecting probe 170 and causes the detecting member 168 to swing upwardly, the detecting probe 172 is positioned between the elements of a photosensor 174, which detects the presence of the spool 16 in the engaging slot attitude setting station ST2.

As shown in FIG. 10, an insertion detecting mechanism 176 is disposed in the film inserting station ST3. The insertion detecting mechanism 176 is mounted on a link 180 which is vertically movable by a drive link 178 that is actuated in synchronism with the drive link 172. The insertion detecting mechanism 176 has a detecting plate 182 which is positioned in confronting relation to the engaging slot 20a of the spool 16 remotely from the film insertion end thereof when the insertion detecting mechanism 176 is brought into a lowermost position.

The detecting plate 182 is swingably supported by a pivot 183 on the link 180 and supports a dog 184 on its upper end. When the leading end of the elongate film F abuts on the detecting plate 182, the dog 184 triggers a photosensor 186 to detect when the elongate film F is inserted into the engaging slot 20a.

In the prewinding station ST4 and the winding station ST5 as shown in FIG. 3, rotational forces can be transmitted from respective servomotors (not shown) to the movable chucks 148 of the spool chucks 144 positioned in these stations.

In the film scroll removing station ST6, there is provided a transfer device 190 for receiving a film scroll 12 having a fixed-length film 18 wound around a spool 16 from the spool chuck 144 and delivering the received film scroll 12 to a next process.

Operation of the film processing and packaging system 14 with respect to the film scroll producing apparatus 10 according to the first embodiment will be described below.

Figure 12A:
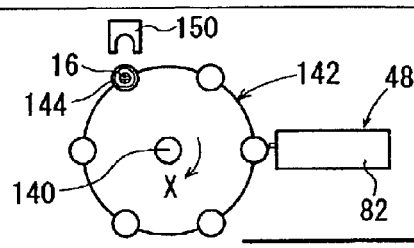
FIGS. 12A through 12F are views showing the manner in which an elongate film is wound around a spool.

As shown in FIG. 9, in the spool installing station ST1, a spool 16 is supported by the support arm 150 and supplied to one of the spool chucks 144 on the turntable 142. On the spool chuck 144, the movable chuck 148 is displaced to the fixed chuck 146 by a spring (not shown) until the movable chuck 148 and the fixed chuck 146 grip the respective opposite ends of the spool 16 (see FIG. 12A).

Figure 12B:
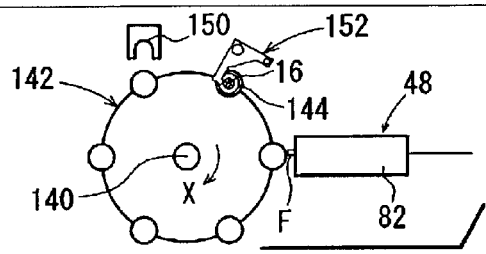

Then, the main shaft 140 is intermittently rotated in the direction indicated by the arrow X to bring the spool chuck 144 which is gripping the spool 16 into the engaging slot attitude setting station ST2 (see FIG. 12B). At this time, as shown in FIG. 10, the pawl 154 is retracted out of the path of the spool 16 as indicated by the two-dot-and-dash lines.

The spool 16 abuts on the detecting member 168 of the spool detecting mechanism 164, whereupon the photosensor 174 confirms the presence of the spool 16 (see FIG. 11). Thereafter, the drive link 162 is actuated.

The swing arm 156 coupled to the drive link 162 is swung downwardly about the swing shaft 160, turning the pawl 154 toward the spool 16 placed in the engaging slot attitude setting station ST2. In the engaging slot attitude setting station ST2, the spool 16 is being rotated by the rotary actuator (not shown). The spool 16 stops its rotation when the pawl 154 engages the step 20c of the shank 20 of the spool 16.

The spool 16 now has its attitude set to the angle of $\alpha°$ corresponding to the predetermined angle for preventing film insertion, so that the spool 16 can well be phased in the film inserting station ST3. Thereafter, the turntable 142 is turned with the main shaft 140 through a predetermined angle of about 60° in the direction indicated by the arrow X, placing the spool 16 in the film inserting station ST3.

As shown in FIG. 2, the unreeling unit 30 is actuated to rotate the film roll 24 in the direction indicated by the arrow to unreel the elongate film F from the film roll 24. The elongate film F is fed through the splicing unit 32 to the perforating unit 34 where perforations 18c are formed in the opposite side edges of the elongate film F (see FIG. 1).

The perforated elongate film F is then fed to the side printing unit 36. In the side printing unit 36, the first printer 38 records a strip-like side print depending on the type of the elongate film F as a latent image on one or both side edges of the elongate film F. The elongate film F with the recorded strip-like side print is then fed while a free loop is being formed therein. Then, the second printer 40 records a DX bar code, frame numbers, frame number bar codes, and a product name depending on the size of the elongate film F as a latent image on the elongate film F.

Then, as shown in FIG. 3, the servomotor (not shown) of the first feed mechanism 44, the servomotor 64 of the second feed mechanism 46, and the inserting motor 72 of the inserting mechanism 48 are synchronously energized. The elongate film F is now fed in the direction indicated by the arrow A by the sprocket 50 whose teeth engage in the perforations 18c defined in the side edges of the elongate film F. The leading end of the elongate film F passes through the cutting mechanism 42 to the nip roller pair 60 of the second feed mechanism 46.

Figure 13A:
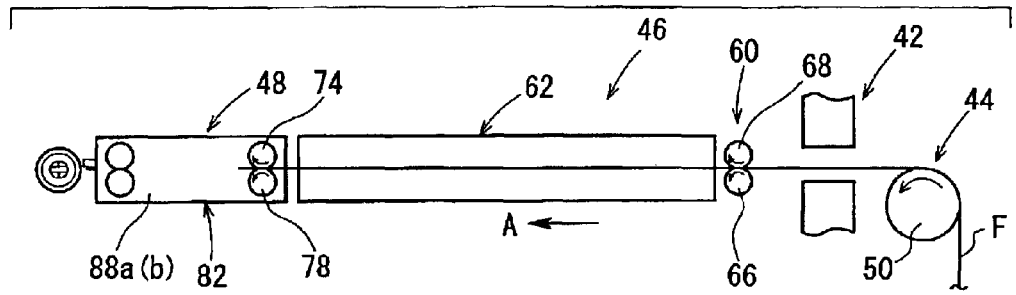
FIGS. 13A through 13D are views showing the manner in which the leading end of the elongate film is inserted into the spool.

The drive roller 66 of the nip roller pair 60 is rotated to feed the elongate film F which is gripped between the drive roller 66 and the driven roller 68, in the direction indicated by the arrow A. At the same time, the side edges of the elongate film F are supported by the film guide 62. The leading end of the elongate film F is inserted from the film guide 62 into a position between the first inserting roller 74 and the first pinch roller 78 of the inserting mechanism 48 (see FIG. 13A). The leading end of the elongate film F is guided by the guide plates 88a, 88b and inserted between the second inserting roller 76 and the second pinch roller 80 (see FIG. 13B), and the engaging slot phasing mechanism 92 is actuated.

Figure 14A:
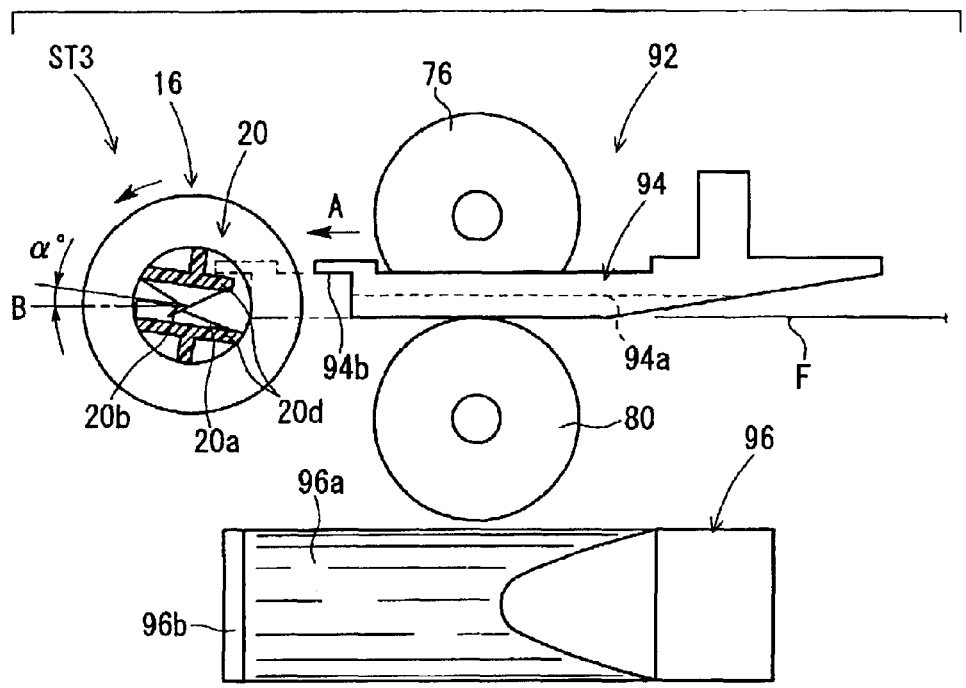
FIGS. 14A and 14B are views showing the manner in which the engaging slot phasing mechanism operates.

In the film inserting station ST3, as shown in FIG. 14A, the film insertion end of the engaging slot 20a of the spool 16 has been angularly spaced downwardly by the angular angle of $\alpha°$ (3° to 45°, more preferably 5° to 30°) for preventing film insertion from the angular position B for film insertion.

As shown in FIG. 7, the drive link 114 of the first drive mechanism 98 is actuated to cause the swing cam 108 to swing about the shaft 112 in the direction indicated by the arrow D. The post 106 inserted in the opening 110 in the swing cam 108 moves the slide base 104 along the linear guides 102 in the direction indicated by the arrow C. The upper insertion guide 94 fixed to the slide base 104 by the mount base 116 then moves in the direction indicated by the arrow A as indicated by the two-dot-and-dash lines in FIG. 14A. The first step 94b on the tip end of the upper insertion guide 94 moves closely to one of the walls 20d of the shank 20 of the spool 16.

Figure 14B:
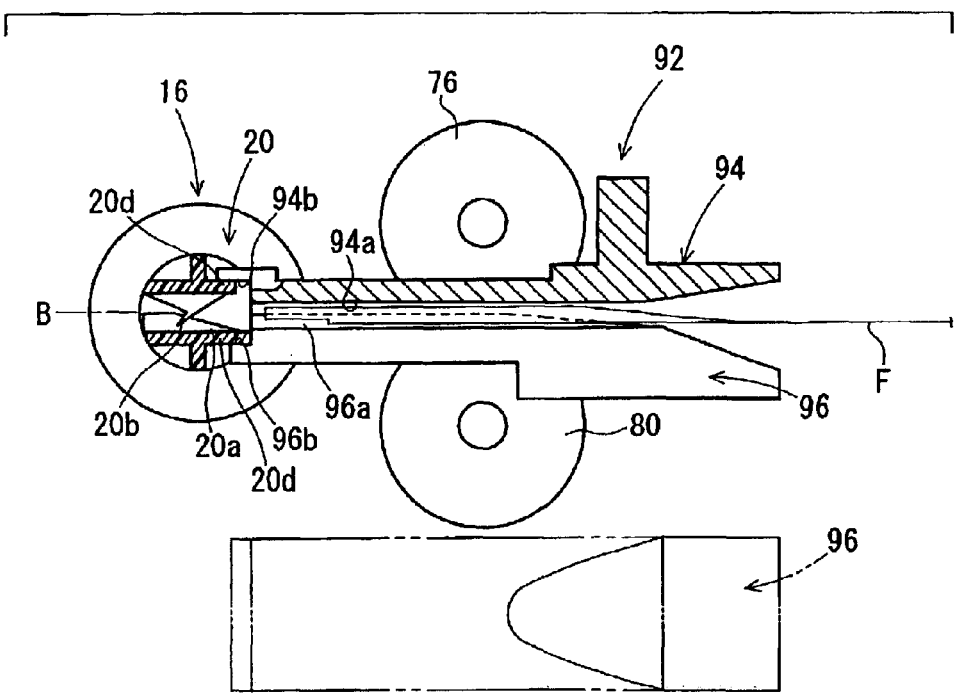

Then, as shown in FIG. 7, the drive link 126 of the second drive mechanism 100 is actuated to cause the link 124 to turn the movable sleeve 120. The lower insertion guide 96 mounted on the movable sleeve 120 by the arm 122 is angularly moved from the vertical attitude into the horizontal attitude until the second step 96b on the tip end of the lower insertion guide 96 engages the other wall 20d of the spool 16. As shown in FIG. 14B, the upper insertion guide 94 and the lower insertion guide 96 now grip the shank 20 of the spool 16 therebetween, with the engaging slot 20a being aligned with the angular position B for film insertion.

At this time, the film guide passage 129 is defined which extends continuously from the upper insertion guide 94 and the lower insertion guide 96 to the engaging slot 20a (see FIG. 8). Therefore, the leading end 18a of the elongate film F which is fed in the direction indicated by the arrow A by the inserting mechanism 48 is inserted through the passage 129 into the engaging slot 20a of the spool 16, and the teeth 20b engage in the respective holes 18b defined in the leading end 18a.

Figure 13B:
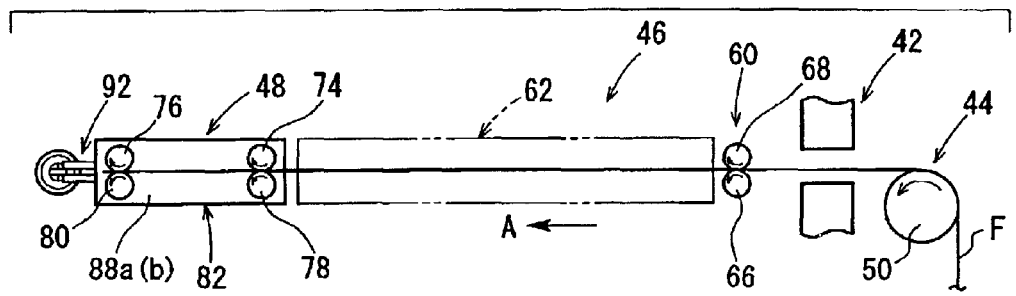

When the leading end of the elongate film F is fed toward the inserting mechanism 48, the film guide 62 is opened, releasing the elongate film F from its guiding action (see FIG. 13B).

Figure 12C:
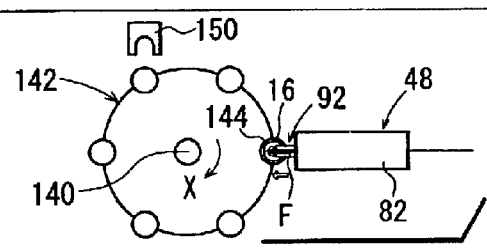

The leading end 18a of the elongate film F fed into the inserting mechanism 48 is inserted into the engaging slot 20a of the spool 16 on the turntable 142, and projects from the other end of the engaging slot 20a on the opposite side of the spool 16 (see FIG. 12C). At this time, as shown in FIG. 10, the insertion detecting mechanism 176 is positioned on the opposite side of the spool 16 where the leading end of the elongate film F projects. The leading end 18a of the elongate film F which has passed through the engaging slot 20a and projects therefrom pushes the detecting plate 182 of the insertion detecting mechanism 176. The upper end of the detecting plate 182 is angularly moved toward the photosensor 186, causing the dog 184 to trigger the photosensor 186, which detects the insertion of the elongate film F in the engaging slot 20a.

Figure 13C:
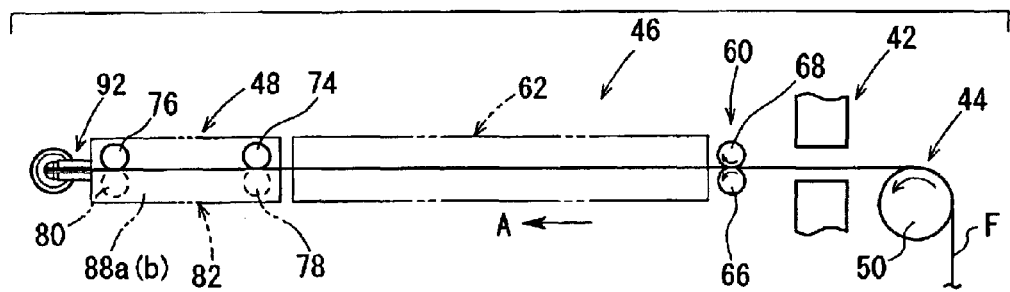

Based on a detected signal from the photosensor 186, the drive links 90a, 90b are actuated to rotate the pivot shafts 86a, 86b. As shown in FIG. 6, the guide plates 88a, 88b are swung away from each other, i.e., opened, to release the elongate film F from their guiding action. The first and second pinch rollers 78, 80 mounted on the guide plates 88a, 88b are also swung with the guide plates 88a, 88b, and the inserting motor 72 is de-energized (see FIG. 13C).

Figure 13D:
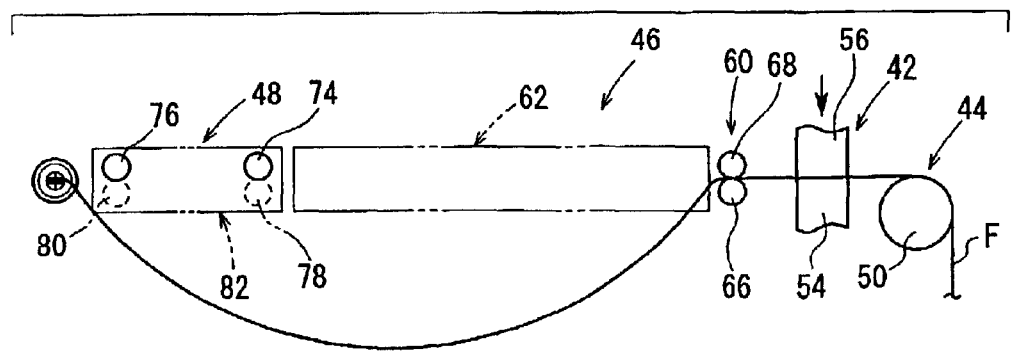

The elongate film F is fed by the sprocket 50 and the nip roller pair 60 by a preset length from the cutting position in the direction indicated by the arrow A, forming a loop between the spool 16 and the nip roller pair 60. When the elongate film F is fed the preset length, the sprocket 50 and the nip roller pair 60 are inactivated, and the cutting mechanism 42 is actuated or turned on. The movable blade 56 is lowered to cut or trim the elongate film F in coaction with the fixed blade 54 (see FIG. 13D).

Figure 12D:
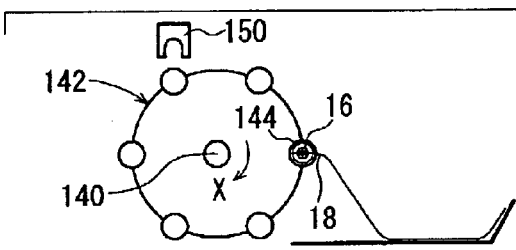

A fixed-length film 18 thus cut off the elongate film F by the cutting mechanism 42 is fed by the nip roller pair 60 to move its trailing end 18d in the direction indicated by the arrow A. The trailing end 18d of the fixed-length film 18 is released from the nip roller pair 60, and only its leading end 18a is inserted in and supported by the spool 16 (see FIG. 12D).

Figure 12E:
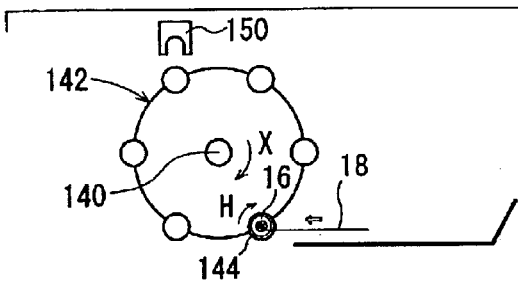

After the turntable 142 is indexed a predetermined angle in the direction indicated by the arrow X and reaches the prewinding station ST4, the servomotor (not shown) is energized to rotate the spool chuck 144. As shown in FIG. 12E, the spool 16 held by the spool chuck 144 is rotated in the direction indicated by the arrow H, prewinding the fixed-length film 18 whose leading end 18a is engaging the spool 16 to a predetermined length around the spool 16.

Figure 12F:
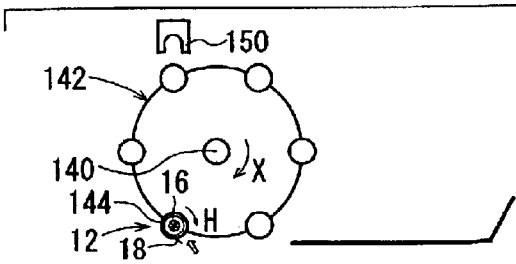

After the turntable 142 is indexed a predetermined angle in the direction indicated by the arrow X and reaches the winding station ST5, the spool chuck 144 holding the spool 16 with the prewound film is rotated by the servomotor in the direction indicated by the arrow H. The fixed-length film 18 is now wound around the spool 16, producing a film scroll 12 (see FIG. 12F). The film scroll 12 is delivered to the film scroll removing station ST6, from which the film scroll 12 is removed by the transfer device 190 and delivered to a next process.

According to the first embodiment, as described above, when the spool 16 is placed in the engaging slot attitude setting station ST2, the engaging slot 20a of the spool 16 is set in attitude to the angular range of $\alpha°$ by the engaging slot attitude setting mechanism 152. The angular range of $\alpha°$ is selected such that the film insertion end of the engaging slot 20a is angularly spaced downwardly by an angular range (e.g., 5° to 30°) for preventing film insertion from the central line O passing through the center of the turntable 142. Therefore, when the turntable 142 is indexed in the direction indicated by the arrow X to bring the spool 16 into the film inserting station ST3, the engaging slot 20a of the spool 16 is angularly displaced in the angular range (e.g., 5° to 30°) for preventing film insertion.

In the film inserting station ST3, before the elongate film F is inserted into the engaging slot 20a, the engaging slot phasing mechanism 92 operates to align the engaging slot 20a with the angular position B for film insertion.

Since the engaging slot 20a of the spool 16 is phased in the film inserting station ST3, the spool 16 is prevented from being angularly moved out of phase in the film inserting station ST3 when the turntable 142 is rotated. If the spool 16 were phased in a previous step and then moved to the film inserting station ST3 for insertion of the elongate film F, then the spool 16 would tend to be angularly moved out of phase upon rotation of the turntable 142 to move the spool 16 to the film inserting station ST3. According to the present invention, such a problem does not arise in the film inserting station ST3.

According to the first embodiment, therefore, the spool 16 is accurately aligned with the angular position B for film insertion, and the elongate film F can reliably be inserted into the spool 16 in the film inserting station ST3. Film scrolls 12 can thus be produced efficiently and successively produced on the turntable 142.

The film inserting station ST3 is preceded by the engaging slot attitude setting station ST2 in which the engaging slot 20a of the spool 16 sets its attitude to a predetermined angular range for allowing the spool 16 to be phased quickly in the film inserting station ST3. Therefore, the spool 16 can be phased efficiently and reliably in the film inserting station ST3, and the cycle time of operation of the film scroll producing apparatus 10 is effectively prevented from being increased.

The engaging slot phasing mechanism 92 has the upper insertion guide 94 which is horizontally movable and the lower insertion guide 96 which is angularly movable between the vertical attitude and the horizontal attitude. The first step 94b of the upper insertion guide 94 and the second step 96b of the lower insertion guide 96 grip the shank 20 of the spool 16 to align the engaging slot 20a with the angular position B for film insertion. Consequently, the spool 16 can be phased highly accurately in the film inserting station ST3 with a simple process and arrangement.

The film guide passage 129 is defined which extends continuously from the upper insertion guide 94 and the lower insertion guide 96 to the engaging slot 20a. There is no undue gap created between the upper insertion guide 94 and the lower insertion guide 96, and it is possible to insert the leading end 18a of the elongate film F which may be largely curled reliably into the engaging slot 20a. The stability with which to insert the leading end 18a of the elongate film F into the engaging slot 20a is effectively increased.

The first and second steps 94b, 96b have their respective thicknesses which are equal to or greater than the thicknesses of the walls 20d of the spool 16 which define the engaging slot 20a therebetween. Therefore, as shown in FIG. 8, the width L1 of the gap 128 defined between the first and second curved guide surfaces 94a, 96a is smaller than the width L2 of the engaging slot 20a. When the leading end 18a of the elongate film F is transferred from the first and second curved guide surfaces 94a, 96a to the engaging slot 20a, the leading end 18a is not caught by the walls 20d, but can smoothly and reliably be inserted into the engaging slot 20a.

Figure 15:
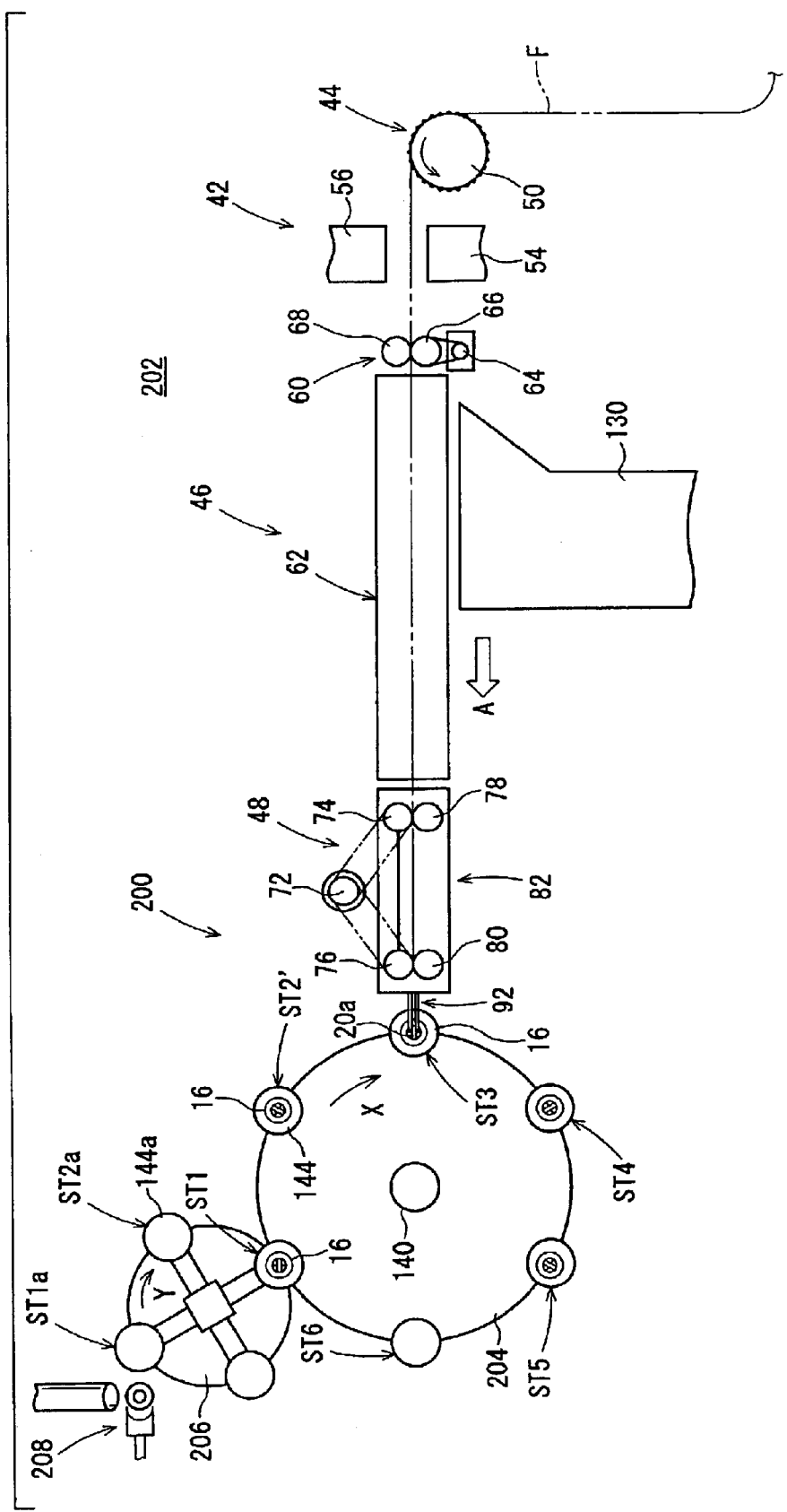
FIG. 15 is a schematic side elevational view of a film processing and packaging system which incorporates a film scroll producing apparatus according to a second embodiment of the present invention.
Figure 16:
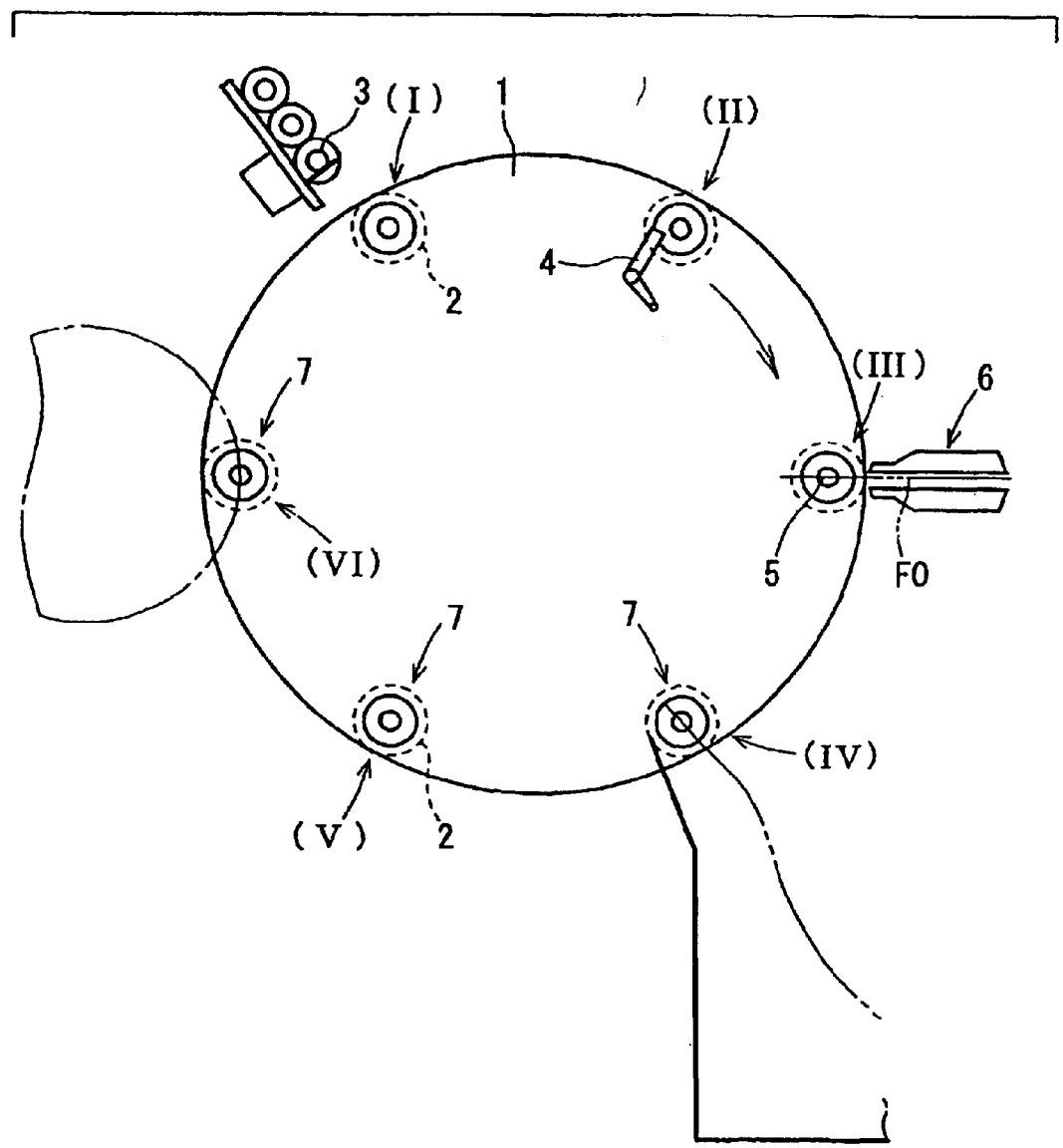
FIG. 16 is a schematic side elevational view of a conventional apparatus for producing a film scroll.

FIG. 15 shows in schematic side elevation a film processing and packaging system 202 which incorporates a film scroll producing apparatus 200 according to a second embodiment of the present invention. Those parts of the film scroll producing apparatus 200 which are identical to those of the film scroll producing apparatus 10 according to the first embodiment are denoted by identical reference characters, and will not be described in detail below.

As shown in FIG. 15, the film scroll producing apparatus 200 has first and second turntables 204, 206. The first turntable 204 has a spool inspecting station ST2' for inspecting the positioning of a spool 16. The spool inspecting station ST2' has a photosensor (not shown) for detecting the engaging slot 20a of a spool 16 to detect the angular position of the spool 16.

The second turntable 206 has four spool chucks 144a disposed at equal angular intervals thereon. The second turntable 206 has a spool receiving station ST1a, an engaging slot attitude setting station ST2a, and a spool installing station ST1 which are successively arranged clockwise in the direction indicated by the arrow Y.

The spool receiving station ST1a has a spool supply unit 208 for supplying spools 16, one by one, to spool chucks 144a. The engaging slot attitude setting station ST2a is identical to the engaging slot attitude setting station ST2 of the film scroll producing apparatus 10 according to the first embodiment.

The film scroll producing apparatus 200 operates as follows. After a spool is supplied from the spool supply unit 208 to a spool chuck 144a in the spool receiving station ST1a, the second turntable 206 is angularly moved about 90° in the direction indicated by the arrow Y. The spool 16 held by the spool chuck 144a is brought into the engaging slot attitude setting station ST2a. In the engaging slot attitude setting station ST2a, the engaging slog 20a of the spool 16 is set to an attitude within a predetermined angular range depending on the angle at which the spool 16 is to be placed in the film inserting station ST3.

Then, the second turntable 206 is angularly moved about 90° to bring the spool 16 whose attitude has been set into the spool installing station ST1. The spool 16 is transferred from the spool chuck 144a on the second turntable 206 to a spool chuck 144 on the first turntable 204, which is then angularly moved about 60° in the direction indicated by the arrow X. The spool chuck 144 which is holding the spool 16 is now placed in the spool inspecting station ST2'.

The spool inspecting station ST2' inspects whether the spool 16 is positioned in a predetermined attitude or not. If the spool 16 is judged as being positioned in the predetermined attitude, then it is brought into the film inserting station ST3. In the film inserting station ST3, the spool 16 is phased, and the leading end 18a of the elongate film F is inserted into the engaging slot 20a of the spool 16, as with the first embodiment.

According to the second embodiment, since the spool 16 is phased in the film inserting station ST3, the leading end 18a of the elongate film F can reliably and smoothly be inserted into the engaging slot 20a of the spool 16. Because the spool 16 has been set in attitude in the engaging slot attitude setting station ST2a on the second turntable 206, the cycle time of the entire process of producing a film scroll 12 can be shortened. Accordingly, the second embodiment offers the same advantages as the first embodiment.

According to the present invention, furthermore, there is also provided a method of producing a film scroll 12 by providing a plurality of intermittently movable spool chucks 144 and moving each of the spool chucks 144 successively through the spool installing station ST1 for installing a spool 16 on the spool chuck, the film inserting station ST3 for inserting and engaging the leading end of a film (the elongate film F of the fixed-length film 18) in the spool 16, a film winding station (the prewinding station ST4 and the winding station ST5) for winding the film around the spool 16, and the film scroll removing station ST6 for removing a film scroll 12, which comprises the film wound around the spool 16, from the spool chuck 144, the method comprising the steps of setting, prior to the film inserting station ST3, the attitude of the engaging slot 20a of the spool 16 to a predetermined angular range corresponding to an attitude with which the spool 16 is placed in the film inserting station ST3, moving the spool 16 whose attitude has thus been set to the film inserting station ST3 to angularly displace the engaging slot 20a by a predetermined angular angle for preventing film insertion in one direction from the angular position B for film insertion, and phasing the spool 16 in the film inserting station ST3 before the elongate film is inserted, thereby to align the engaging slot 20a with the angular position B for film insertion.

In the film inserting station ST3, the film insertion end of the engaging slot 20a is angularly spaced downwardly by 3° to 45°, more preferably 5° to 30° from the angular position B for film insertion.

In the film inserting station ST3, the upper insertion guide 94 and the lower insertion guide 96, which serve as first and second guides, respectively, grip the spool 16 to align the engaging slot 20a with the angular position B for film insertion, and the film guide passage 129 is defined which extends continuously from the upper insertion guide 94 and the lower insertion guide 96 to the engaging slot 20a.

After the upper insertion guide 94 is moved to the spool 16, the lower insertion guide 96 is angularly moved from the vertical attitude into the horizontal attitude. The upper insertion guide 94 and the lower insertion guide 96 which are combined with each other turn the spool 16 to align the engaging slot 20a with the angular position B for film insertion, and provide the film guide passage 129.

In a method of and an apparatus for producing a film scroll according to the present invention, after the engaging slot of the spool is phased in the film inserting station, the film is inserted into the engaging slot. Therefore, the spool is free from phase misalignments which would otherwise occur if the spool were phased in a previous step and then moved to the film inserting station for insertion of the film. In the film inserting station, therefore, the spool is accurately aligned with the angular position for film insertion for reliable insertion of the film into the engaging slot, so that film scrolls can be produced efficiently and successively.

Although certain preferred embodiments of the present invention have been shown and described in detail, it should be understood that various changes and modifications may be made therein without departing from the scope of the appended claims.

What is claimed is:

1. A method of producing a film scroll by moving a spool chuck successively to
   a spool installing station for installing a spool on the spool chuck;
   a film inserting station for inserting and engaging a leading end of a film in the spool;
   a film winding station for winding the film around the spool;
   a film scroll removing station for removing the film scroll, which comprises the film wound around the spool, from the spool chuck,
   the method comprising the steps of:
   prior to the film inserting station, setting an engaging slot of the spool for inserting the film therein to an attitude within a predetermined angular range;
   positioning the engaging slot of the spool such that the engaging slot is angularly spaced by a predetermined angle for preventing film insertion in one direction from an angular position for film insertion when the spool is placed in the film inserting station; and
   phasing the spool before the film is inserted therein, thereby to align the engaging slot with the angular position for film insertion.

2. A method according to claim 1, a film insertion end of the engaging slot is angularly spaced downwardly by an angular angle 3° to 45°.

3. A method according to claim 1, wherein the spool is gripped by first and second guides in the film insertion station to form a film guide passage extending continuously from the first and second guides to the engaging slot.

4. An apparatus for producing a film scroll, comprising:
   a spool installing station for installing a spool on a spool chuck;
   a film inserting station for inserting and engaging a leading end of a film in said spool;
   a film winding station for winding said film around said spool;
   a film scroll removing station for removing a film scroll, which comprises the film wound around the spool, from said spool chuck;
   a conveyance mechanism for intermittently moving a plurality of said spool chucks through the stations;
   an engaging slot attitude setting station, disposed either in a range in which said spool chucks are intermittently moved by said conveyance mechanism or prior to said spool installing station, for setting an engaging slot of said spool for inserting the film therein to an attitude within a predetermined angular range such that when said spool is placed in said film inserting station, the engaging slot of said spool is angularly spaced by a predetermined angle for preventing film insertion in one direction from an angular position for film insertion; and
   said film inserting station having an engaging slot phasing mechanism for phasing said spool before the film is inserted therein, thereby to align said engaging slot with said angular position for film insertion.

5. An apparatus according to claim 4, wherein said engaging slot phasing mechanism comprises:
   first and second guides for gripping said spool to align said engaging slot with said angular position for film insertion; and
   a film guide passage extending continuously from said first and second guides to said engaging slot.

6. An apparatus according to claim 5, wherein said engaging slot phasing mechanism comprises:
   a first drive mechanism for moving said first guide horizontally to said spool to move a tip end of said first guide closely to said spool, and
   a second drive mechanism for angularly moving said second guide from a vertical attitude to a horizontal attitude until a tip end of said second guide abuts on said spool, thereby to cause said first and second guides to align said engaging slot with said angular position for film insertion.

7. An apparatus according to claim 5, wherein said first and second guides have on their tip ends respective first and second steps facing each other, and said first and second steps grip said spool for thereby phasing the spool.

8. An apparatus according to claim 7, wherein said first and second steps have respective depths which are equal to or greater than the thicknesses of a pair of walls of said spool which define said engaging slot therebetween, and said first and second guides define therebetween a gap whose width is smaller than the width of said engaging slot.

9. An apparatus according to claim 7, wherein said first and second guides have concave curved guide surface and convex curved guide surface facing each other.

* * * * *